Feb. 20, 1968          J. O. KING, JR          3,369,440

LIGHTWEIGHT FASTENER

Filed Feb. 7, 1966

INVENTOR
John O. King. Jr.

Newton, Hopkins,
Jones & Ormsby

BY:

ATTORNEYS they hold together. How-
United States Patent Office 3,369,440
Patented Feb. 20, 1968

3,369,440
LIGHTWEIGHT FASTENER
John O. King, Jr., 110 Lake Forrest Lane,
Atlanta, Ga. 30305
Filed Feb. 7, 1966, Ser. No. 525,416
6 Claims. (Cl. 85—9)

ABSTRACT OF THE DISCLOSURE

A lightweight fastener including a head, a tapered shank portion and an attaching portion integral with each other, the head being integral with the larger end of the shank portion and the attaching portion being integral with the other end of the shank portion. A recess is defined in the head and the shank portion so that the wall thickness of the shank portion decreases as the external diameter of the shank portion increases.

---

This invention relates generally to fasteners for attaching together a plurality of pieces of material having alignable apertures therethrough, and more particularly to a lightweight fastener having a tapered shank.

As the aircraft and spacecraft industries have become more and more sophisticated, weight has become a critical concern in each of the components of the structures. This concern is also being reflected in the fasteners used in attaching parts of the structures together since the total weight of all fasteners used in the structure forms a substantial portion of the total weight of the aircraft or spacecraft structure.

It has been discovered that fasteners having tapered shank portions rather than straight shank portions serve to better attach workpieces together since the tapered shank insures a constant interference fit or a fit in which the bearing load is equally distributed along the length of the shank. Moreover, it has been found that the larger the diameter of the shank, the less the tearing of the fastener through soft parts such as the metal skin of the structure when the parts are loaded. In other words, the load is distributed over a larger area of the part thereby reducing the load per unit area that the part has to carry.

Previous fasteners have been provided with a tapered shank portion of a large diameter so that they have a constant interference fit and prevent the fastener from tearing through the parts which they hold together. However, since this increased diameter served to increase the total weight of the fastener, some means had to be provided for reducing this weight without reducing the strength of the fastener. This has been provided by a hole of constant diameter drilled a portion of the way through the head and shank of the fastener. Although the hole did serve to partially reduce the weight of the fastener, the maximum reduction of weight was not achieved since the diameter of the hole within the shank was determined by the minimum wall thickness required at the termination point of the hole in the shank.

The invention disclosed herein overcomes these and other problems and disadvantages associated with prior art fasteners by providing a minimum wall thickness at every point along the tapered shank portion of the fastener without reducing the necessary strength of the shank to hold the parts together. These advantages are provided by a fastener having a tapered shank portion with a hole therein so that the wall thickness of the shank portion is substantially constant along the length thereof. This is effective to insure sufficient strength to properly hold the parts in place and to provide the minimum weight for the fastener.

These and other features and advantages of the invention will become more clearly understood upon consideration of the following specification and accompanying drawings wherein like characters of reference designate corresponding parts throughout and in which.

These figures and the following detailed description disclose specific embodiments of the invention; however, the inventive concept is not limited thereto since the invention may be embodied in other equivalent forms.

Figure 1:
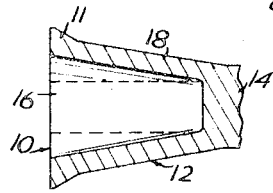
FIG. 1 is a longitudinal cross-sectional view of one embodiment of the invention.

Referring to FIG. 1, it will be seen that the first embodiment of the invention is shown included in a fastener 10. The fastener 10 has a head 11 and a shank 12 integral with the head 11 and extending outwardly therefrom. The shank portion 12 is tapered constantly along the length thereof and integrally joins an attaching portion 14 at the outer extending end thereof. The shank portion 12 contacts the sides of suitable apertures A through pieces of material P to align the pieces of material P and the attaching portion 14 is effective to hold the rivet 10 in place as will be explained hereinafter. Usually the shank portion 12 is hardened to provide a stronger fastening of the pieces of material P together but the attaching portion 14 may be selectively annealed or hardened, depending on the type of fastener the fastener 10 is to be.

Extending through the head 11 and a portion of the way through the shank portion 12 in a recess 16 which is tapered in a corresponding manner to the shank portion 12. The centerline of the recess 16 coincides with the center line of the fastener 10 and terminates just short of the junction of the shank portion 12 and the attaching portion 14. This is effective to preclude the recess 16 of the fastener 10 from opening through the attaching portion 14 when the fastener 10 is locked in place as will be explained hereinafter. This is effective to preclude the passage of fluids through the fastener when it is locked in place.

The taper of the recess 16 serves to provide a side wall 18 of uniform thickness along substantially the entire length of the shank portion 12. This side wall thickness is effective to provide sufficient strength to the fastener 10 since the force on the fastener 10 is no greater at any point along the length of the shank portion 12 than at the point of minimum thickness at the terminal point of the recess encountered in prior art fasteners. Therefore, no strength requirements are relinquished with the present invention; however a substantial weight saving is produced over that of prior art fasteners using a conventional cylindrical recess to lighten the fastener. This is more clearly shown by the dashes lines in FIG. 1 showing the outline of conventional cylindrical recesses of conventional lightened rivets.

Figure 2:
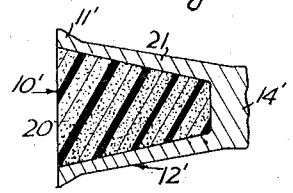
FIG. 2 is a longitudinal cross-sectional view of another embodiment of the invention.

Referring to FIG. 2, it will be seen that a second embodiment of the invention is shown incorporated in a fastener 10' having a head 11', a shank portion 12', an attaching portion 14' similar to the corresponding parts of the fastener 10. A recess 20 extending into the shank portion 12', however, is somewhat different than that of the recess 16 in the fastener 10 in that the taper of the recess 20 is greater than that of the shank portion 12' and the minimum diameter is the same as that of the recess 16. This means that the thickness of the side wall 21 of the shank portion 12' is equal to that of the side wall 18 at the terminal point of the recess 16 at the terminal point of the recess 20 but that the thickness of the side wall 21 gradually decreases toward the head 11'. It can readily be seen that, since the total load on the fastener 10' is equally distributed along the length of the shank portion 12', the load per unit area decreases as the diameter, and thus the circumference of the shank portion 12' increases. This means, then, that less strength per unit area of the shank portion 12' is needed as the diameter of the shank portion 12' increases. Therefore, the decrease in side wall thickness toward the head 11' of the fastener 10' may be easily determined since the thickness of the side wall 21 is inversely proportional to the change in diameter of the fastener 10'.

The recess 16 or 20 may be filled with some extremely lightweight material such as a plastic foam shown in FIG. 2. This will be effective to present a smooth surface across the head 11 or 11' as is, in many cases, desirable. Also, the recess 16 or 20 may be capped with a thin plate (not shown) so that the fastener 10 or 10' may be easily driven.

Figure 3:
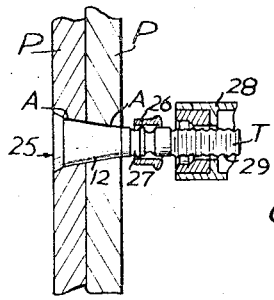
FIG. 3 is a cross-sectional view showing the invention in use in a locking bolt.

FIG. 3 illustrates the use of the invention in a tapered locking bolt 25 of conventional design having a head 11, a tapered shank 12 and a pin tail T. A collar 26 is to be used with the bolt 25 in conventional manner to be swaged around and grip the bolt 25 at its locking groove 27 by a conventional swaging gun 28 to fasten pieces of material P together. The pin tail T corresponds to the attaching portion 14 and has pulling grooves 29 therearound effective to be gripped by the swaging gun 28 in conventional manner.

Figure 4:
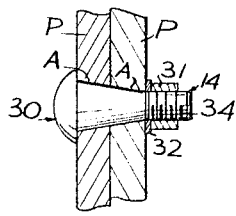
FIG. 4 is a cross-sectional view showing the invention in use in a conventional bolt.

FIG. 4 illustrates the use of the invention in a tapered bolt 30 of conventional design wherein the attaching portion 14 is in the form of a threaded portion 34 effective to threadedly receive a nut 31 and lock washer 32 thereon to fasten pieces of material P together. The bolt 30 is installed in conventional manner thereto by tightening the nut 31 on the threaded portion 34 with a conventional wrench (not shown).

Figure 5:
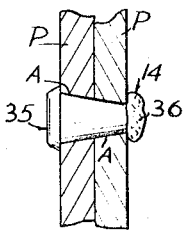
FIG. 5 is a cross-sectional view showing the use of the invention in a rivet.

FIG. 5 illustrates the use of the invention in a rivet 35 wherein the attaching portion 14 is in the form of a peenable stub 36 effective to be received through a pieces of material P and hold them together when the softened stub 36 at the end of the shank portion 38 is peened over to lock the rivet 35 in place.

It will be obvious to those skilled in the art that many variations may be made in the embodiments herein chosen for the purpose of illustrating the present invention without departing from the scope thereof as defined in the appended claims.

What is claimed is:

1. A lightweight fastener for connecting a plurality of pieces of material having aligned apertures extending therethrough comprising:
   (a) a head;
   (b) a tapered shank portion integral with said head and extending outwardly therefrom, said shank portion and said head having a common centerline and defining a common recess having its centerline coinciding with said common centerline; and,
   (c) said shank portion having its maximum diameter adjacent said head portion and having a wall thickness along the length thereof which decreases as the external diameter of said shank portion increases,
   (d) and an attaching portion integral with the extending end of said shank portion, said recess in said shank portion terminating just inwardly of the junction of the shank portion and the attaching portion.

2. The fastener of claim 1 wherein said recess is filled with a lightweight material to provide a smooth surface at said head.

3. The fastener of claim 1 wherein said attaching portion defines a locking groove in the periphery thereof to receive a swagable collar therein and a plurality of pulling grooves therearound to be grasped and apply tension to said fastener during installation.

4. The fastener of claim 1 wherein said attaching portion is threaded to receive a nut thereon.

5. The fastener of claim 1 wherein said attaching portion is capable of being upset to retain the fastener in place within the pieces of material.

6. The fastener of claim 1 wherein the wall thickness of said shank portion is inversely proportional to the external diameter of said shank portion.

References Cited

UNITED STATES PATENTS

| | | | |
|---|---|---|---|
| 1,603,195 | 10/1926 | Crain | 85—9 |
| 2,092,372 | 9/1937 | Goeller | 85—9 |
| 2,120,061 | 6/1938 | Blakeslee | 85—32 |
| 2,353,110 | 7/1944 | Camp | 85—54 |
| 2,774,098 | 12/1956 | Tieri | 85—82 |
| 3,034,611 | 5/1962 | Zenzic | 85—1 |
| 3,095,776 | 7/1963 | Brilmyer et al. | |
| 3,270,410 | 9/1966 | Salter et al. | 85—1 |

FOREIGN PATENTS

| | | |
|---|---|---|
| 351,850 | 12/1929 | Great Britain. |
| 4,830 | 12/1895 | Norway. |
| 790,051 | 2/1958 | Great Britain. |

EDWARD C. ALLEN, *Primary Examiner.*